Patented Mar. 9, 1926.

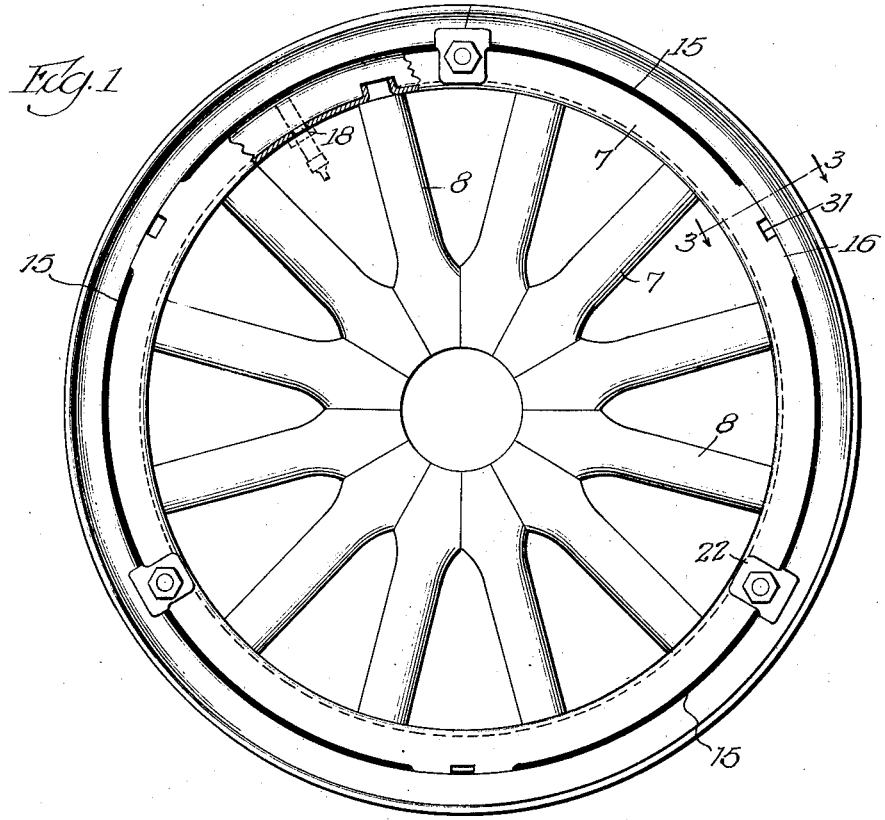

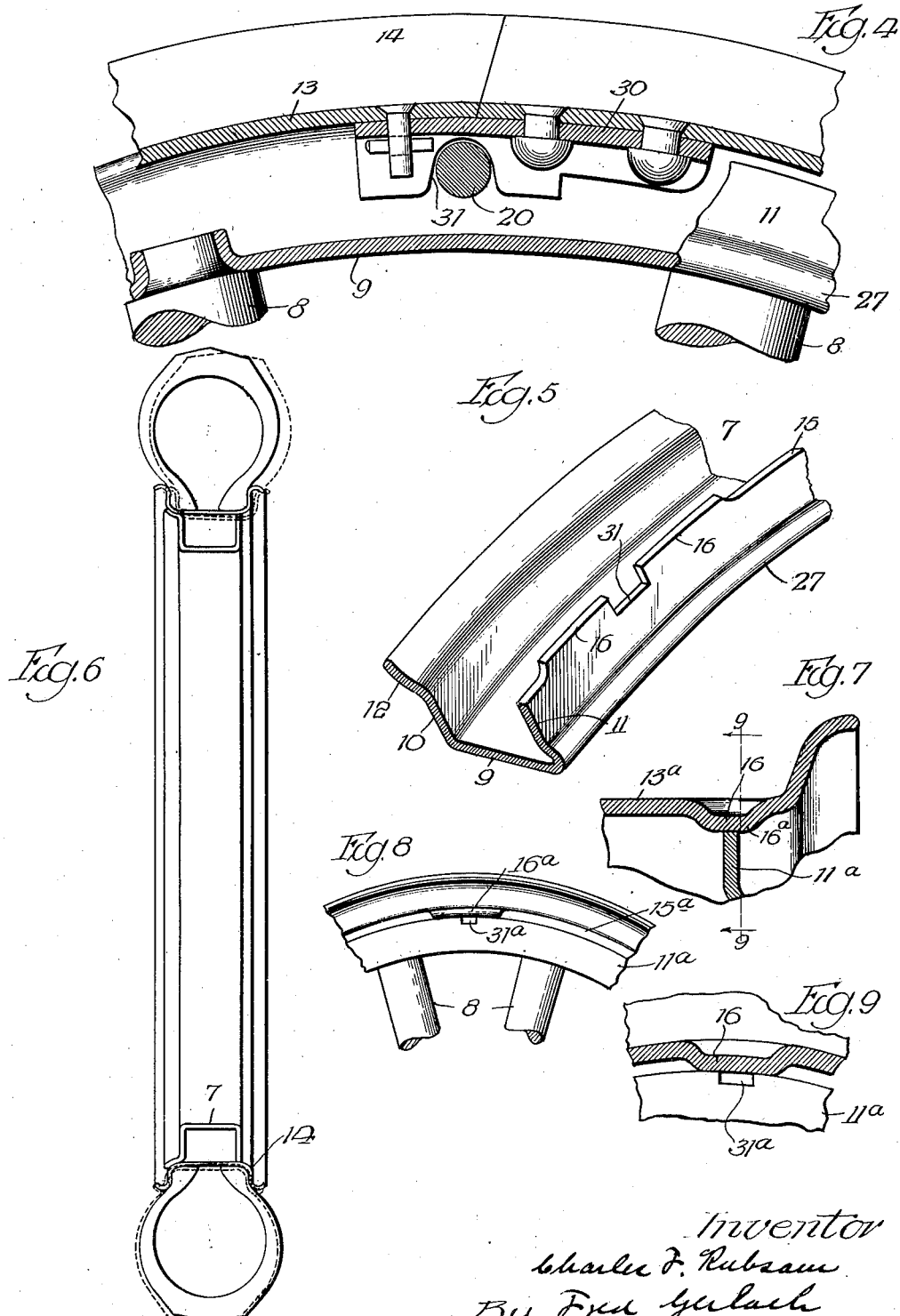

1,576,225

UNITED STATES PATENT OFFICE.

CHARLES F. RUBSAM, OF JACKSON, MICHIGAN, ASSIGNOR TO RUBSAM CORPORATION, OF JACKSON, MICHIGAN, A CORPORATION OF DELAWARE.

VEHICLE WHEEL.

Application filed March 26, 1924. Serial No. 701,900.

*To all whom it may concern:*

Be it known that I, CHARLES F. RUBSAM, a citizen of the United States, and a resident of Jackson, in the county of Jackson and State of Michigan, have invented certain new and useful Improvements in Vehicle Wheels, of which the following is a full, clear, and exact description.

The invention relates to vehicle-wheels and more particularly to the type which is provided with a demountable tire-carrying rim.

Objects of the invention are to provide, a wheel with a metallic inner rim which is simple in construction and efficient in operation; an improved construction in which the demountable rim will be seated and truly supported and aligned at both sides of the metallic fixed rim of the wheel-body; an improved construction for securing the demountable rim concentrically around the fixed rim; and an improved construction in which the minimum number of securing devices, such as clamping or wedge lugs, will suffice to efficiently, accurately and removably hold the demountable rim on the fixed rim of the wheel-body. Other objects will appear from the detail description of the invention.

The present application is, in part, a continuation of an application filed by me October 9, 1919, Serial No. 329,500.

The invention consists in the several novel features hereinafter set forth and more particularly defined by claims at the conclusion hereof.

In the drawings: Fig. 1 is a side elevation of a wheel embodying the invention, a portion of the fixed rim being shown in section. Fig. 2 is a transverse section. Fig. 3 is a section on line 3—3 of Fig. 1. Fig. 4 is a longitudinal section of a portion of the wheel. Fig. 5 is a perspective of a portion of the fixed rim. Fig. 6 is a transverse diagrammatic section of the wheel, illustrating in full and dotted lines the correct and disaligned positions of the demountable rim on the fixed rim. Fig. 7 is a cross section of a modified form of the invention. Fig. 8 is a side elevation of the fixed and demountable rims shown in Fig. 7. Fig. 9 is a section on line 9—9 of Fig. 7.

The invention is exemplified in a wheel-body composed of a fixed rim 7 and spokes 8 secured therein in any suitable manner. Rim 7 is made of a single sheet of metal in the form of an annular channel and has a base 9 which is perforated and attached to the spoke-terminals, and integral side flanges 10 and 11. Side flange 10 terminates in a flare rim-receiving flange 12 at the vehicle or inner side of the wheel to form an annular seat for one side of the inner periphery of a demountable rim of conventional shape. The latter comprises a base 13 and integral tire-retaining flanges 14 which may be shaped for any type of tire. The outer side-flange 11 of the fixed rim extends radially outward and its outer periphery is substantially the same diameter as the contiguous portion of the inner periphery of the demountable rim so that the outer side of the demountable rim will also be directly supported by the flange 11 of the fixed rim. This flange is cut away to form three arcuate clearances 15, leaving three localized arcuate or comparatively short rim-supporting portions 16 to engage and internally support the rim adjacent its outer side at three points which are equally spaced apart, circumferentially. These supports 16 are designed to fit snugly in the base of the demountable rim, although it will be understood that the internal diameter of commercial rims vary slightly, and the clearances 15 between these supports are provided to permit the demountable rim to be placed on and removed from the fixed rim by transverse tilting while the usual tire-valve on the demountable rim is in the usual hole 18 in the base of the fixed rim.

Three removable attaching or clamping devices are provided at points circumferentially midway between the three supports 16 or separated from them by approximately 60°, and these devices are also adapted to support the demountable rim on its outer side at said points, so that the demountable rim will be supported at one side by three integral supports and three removable supports. Each of these devices comprises a bolt having a head 19 engaging the outer side of flange 10, a shank 20 extending through aligned holes 21 in flanges 10 and 11, a lug or member 22 which has a hole 23, through which shank 20 passes, and a nut 24 threaded to the shank for securing the lug or member 22 in its operative position. Each lug 22, at its inner end, has a curved concave seat 26 engaging an annular bulge 27 on the fixed rim and at its outer end a curved seat 28 to engage the curved outer corner of the demountable rim. These seats are adapted to permit a measure of pivotal self-positioning of the lug when it is forced inwardly by the nut. The lug will be held against inward radial movement by the bulge 27 to cause the seat 28 of the lug to support and stress outwardly the demountable rim and tightening the nut will also force the demountable rim laterally so its inner side will be snugly seated on the annular flared flange 12 of the fixed rim, as more fully set forth in an application filed by me July 27, 1923, Serial No. 654,081.

The demountable rim shown is of the transversely split type with its ends fixed together by a locking plate 30 which is riveted to one rim-end and removably secured to the other, as well understood in the art. This plate is notched at 31 to straddle one of the bolts 20 to form a driving-connection between the fixed and demountable rims. The hole 18 for the tire-valve is disposed adjacent the bolt which receives the driving and lock-plate 30, so that the tire-valve can pass into and out of hole 18 and the plate can interlock with and be withdrawn from said bolt simultaneously by radial movement of the demountable-rim.

In placing the demountable rim on the wheel-body the latter is usually rotated to bring the bolt adjacent the hole 18 to the top; the demountable rim is tilted transversely to bring the tire-valve and plate 30 substantially into vertical alignment with hole 18 and the upper bolt and then dropped until the valve has entered said hole and the driving and lock plate and said bolt are interlocked. The lower portion of the demountable rim is then swung inwardly and substantially into alignment with the fixed rim; next, the lugs 22 are replaced on the two lower bolts, the upper one having been kept loosely in place; and then all the nuts are tightened until all the lugs are firmly clamped in operative positions. To remove the demountable rim, it is only necessary to remove the two lower lugs, and loosen the upper one, and then manipulate it reversely to the placement operation.

When the demountable rim, in being placed on the wheel-body, has been swung into substantial alignment therewith, the three fixed supports 16, integral with the fixed rim, will fit as snugly as possible under the necessary commercial variation, and being circumferentially approximately 120° apart will in and of themselves truly position and support one side of the inner periphery of the demountable rim concentrically with the wheel-body. The snug fit of these supports will, or tend to, put these intermediate portions of the demountable rim under tension across the clearances 15. When the lugs 22 are tightened, their seats 28, which are curved outwardly, will force the demountable rim laterally so its vehicle-side will be forced on the tapered annular seat or flange 12 and simultaneously exert radially outward pressure on its other side where it is already held by supports 16, thus stressing the portions between the supports 16 to draw the demountable rim in such very firm engagement with supports 16 that the entire demountable rim will be efficiently and accurately held on the wheel-body, and so that squeaks will be avoided. This result is attained by the practical minimum number of removable securing or clamping devices since the demountable rim is supported at six points approximately 60° apart, while it is only necessary to remove or replace two lugs and loosen or tighten the third in placement or removal of the demountable rim. In practice, it has been found that the minimum number (three) of fixed supports 16 necessary to accurately position the demountable rim not only facilitates replacement and removal of the demountable rim, but is also most efficient in that it facilitates the tensioning of the rim on and around the supports 16. Another characteristic, which has been observed in practice, is that the demountable rim will, when running, substantially align itself or keep itself aligned longitudinally around the fixed rim, because when the demountable rim is out of such alignment it will be on comparatively high and low portions of the flared flange 12, while the fixed supports 16 will stress the demountable rim to centralize it so it will work its way to its true position. In Fig. 6, the demountable rim is shown in its misaligned position by dotted lines and to illustrate how the fixed supports 16 tend to correct it. This feature is also of advantage in keeping the demountable rim truly aligned when one of the lugs accidently becomes loose.

To facilitate the removal of the demountable rim, each support is shown as provided with a notch 31 to permit a screw-driver or other tool to be inserted between the rims and used as a pry to start or loosen the demountable rim, particularly at the support 16 disposed diametrically opposite the locking-plate 30.

In the form of the invention exemplified in Figs. 7, 8 and 9, the supports between the outer flange of the fixed rim and the demountable rim are formed by three radially inward arcuate indentations in the base 13ª of the demountable rim, leaving circumferential clearances 15ª between them and the periphery of the flange 11ª of the fixed rim which corresponds in diameter to the inner periphery of the indented portions 16ª of the demountable rim, the inner side of the demountable rim being supported by the flange 12 as hereinbefore described. Notches 31ª are formed in flange 11ª for the insertion of a tool to pry the demountable rim from the fixed rim where the demountable rim is supported by the flange 11ª of the fixed rim.

The invention exemplifies a wheel construction which efficiently and accurately secures the demountable rim and in which a small number of securing devices suffice to attain this result, so that the demountable rim can be easily and quickly removed or replaced; also one which is simple in construction and can be produced at a low cost. The invention also exemplifies a wheel construction in which there are supports of limited length between the fixed and the demountable rims with clearances between them of sufficient length to permit the demountable rim to be readily and easily placed on and removed from the fixed rim, and which permit the demountable rim to be tightened by the attaching devices without causing squeaks.

In practice, it has been found that when three equidistantly spaced fixed supports are used, the clearances between them are sufficient to avoid binding of the demountable rim between the supports in the placement and removal of the demountable rim, notwithstanding the usual commercial variations in the internal diameter of the rim when accurate fitting between the supported portions of one side of the inner periphery of the demountable rim is contemplated. It has also been found that when three of said supports are used, the demountable rim can be placed on the fixed rim, will be truly positioned, and fit in firm and close contact with all of them without substantial deformation when it its final position and, therefore, it will successfully avoid squeaks which result when the rim is not firmly seated on all of them. When the demountable rim is held by three supports, it will be positioned so it will engage all of them, while on the other hand, when a greater number of these supports are used, these desiderata are not attained, because of the likelihood of one of them being out of contact. For these reasons, the number of the fixed supports is of importance in the attainment of some of the objects of the invention.

The invention is not be understood as restricted to the details set forth, since these may be modified within the scope of the appended claims, without departing from the spirit and scope of the invention. For example, while a clearance 15 has been shown adjacent the lug which is usually left loosely in place during removal and replacement of the demountable rim, it might be dispensed with, although in some instances it is preferable to provide it.

Having thus described the invention, what I claim as new and desire to secure by Letters Patent, is:

1. A vehicle wheel comprising a wheel body having a fixed rim of channel shape with a rim receiving flange on the vehicle side and a second flange on the other side, said second flange presenting rim supporting portions and clearances, a demountable rim for said wheel body adapted to be swung into substantial supporting contact with said receiving flange and with the rim supporting portions of said second flange.

2. A vehicle wheel comprising a wheel body having a fixed rim, a demountable rim therefor adapted to be swung onto said wheel body about a portion of the same, said fixed rim being provided with a rim receiving flange on the vehicle side and a second flange on the other side, said second flange having rim supporting portions, said rim supporting portions being connected by portions of said flange of reduced diameter to form clearances, certain of said portions of reduced diameter being so spaced relative to the swinging point and a point diametrically opposite thereof as to allow the demountable rim to be swung into substantially concentric position as to said wheel body.

3. A vehicle wheel comprising a wheel body having a fixed rim of channel shape, a demountable rim therefor, said fixed rim being provided with a rim receiving flange on the vehicle side and a second flange on the other side, said second flange being of substantially the same diameter as the inner periphery of the demountable rim, a plurality of clearances provided in said second flange, so spaced relative to the swinging point and a point diametrically opposite thereof, as to allow the demountable rim to be swung into substantially correct working position on said wheel body.

4. A vehicle wheel comprising a wheel-body having a fixed rim of channel shape, a demountable rim therefor, said fixed rim being provided with a rim receiving flange on the vehicle side and a second flange on the other side, said second flange being of substantially the same diameter as the inner periphery of the demountable rim, a plurality of clearances provided in said second flange, so spaced relative to the swinging point and a point diametrically opposite thereof, as to alloy the demountable rim to be swung into position on said wheel-body, and binding means spaced between and diametrically opposite rim supporting portions of said second flange to exert pressure between the demountable rim and said supporting portions.

5. A vehicle wheel having a wheel body provided with a fixed rim of channel shape, a demountable rim adapted to be swung onto said wheel-body about a portion of the same, said fixed rim having a flange of such diameter as to make it impossible to swing the demountable rim onto said wheel-body except for a plurality of clearances provided in said flange being so spaced relative to the swinging point and a point diametrically opposite thereof as to allow such swinging action to take place.

6. In a vehicle wheel, the combination of a wheel-body having a fixed rim provided with a flange at one side thereof, a demountable rim adapted to be swung onto said fixed rim about a portion of the same, means on the vehicle side of the fixed rim to removably support the demountable rim, supports of limited length between said flange and the demountable rim integral with one of the rims, circumferentially separated by clearances, and removable devices arranged circumferentially between and adapted to support the demountable rim at the clearances between said supports said clearances extending to and said supports terminating at points remote from said devices to permit the demountable rim to be placed on and removed from the fixed rim, and the demountable rim to be tightened on the fixed rim without retardation between the supports.

7. In a vehicle wheel, the combination of a wheel-body comprising a channelled fixed rim having an annular integral flange with a flared portion on the vehicle side thereof and an outwardly extending flange on the other side, a demountable rim adapted to be swung onto said fixed rim about a portion of the same and having one of its sides annularly seated on said flared flange, supports of limited length between said other flange and the demountable rim, integral with one of said rims and circumferentially separated by clearances, and removable devices arranged circumferentially between the integral supports and adapted to support the demountable rim on said other side and in the clearances said clearances extending to and said supports terminating at points remote from said devices to permit the demountable rim to be placed on and removed from the fixed rim, and the demountable rim to be tightened on the fixed rim without retardation between the supports.

8. In a vehicle wheel, the combination of a wheel-body comprising a channelled fixed rim having an annular integral flange with a flared portion on the vehicle side thereof and an outwardly extending flange on the other side, a demountable rim adapted to be swung onto said fixed rim about a portion of the same and having one of its sides annularly seated on said flared flange, supports of limited length between said other flange and the demountable rim, integral with one of said rims, and circumferentially separated by clearances, and removable devices arranged circumferentially between the integral supports and adapted to support the demountable rim on said other side and in the clearances, said devices comprising clamping lugs and bolts said clearances extending to and said supports terminating at points remote from said devices to permit the demountable rim to be placed on and removed from the fixed rim, and the demountable rim to be tightened on the fixed rim without retardation between the supports.

9. In a vehicle-wheel, the combination of a wheel-body comprising a channelled fixed rim having a base, an integral annular flange on the vehicle side with a flared portion on the vehicle side thereof and an outwardly extending flange on the other side with an annular bulge between said base and the latter flange, a demountable rim adapted to be swung onto said fixed rim about a portion of the same and having one of its sides annularly seated on said flared flange, supports of limited length between said other flange and the demountable rim, integral with one of said rims and circumferentially between the integral supports and adapted to support the demountable rim on said other side and in the clearances, comprising lugs between said bulge and the demountable rim, and bolts extending through said flanges said clearances extending to and said supports terminating at points remote from said devices to permit the demountable rim to be placed on and removed from the fixed rim, and the demountable rim to be tightened on the fixed rim without retardation between the supports.

10. In a vehicle-wheel, the combination of a wheel-body having a fixed rim with an annular integral flange on the vehicle side thereof and an integral flange on the other side, a demountable rim having one of its sides annularly seated on said flange on the vehicle side, fixed supports of limited length on the other side of and integral with the other flange of the fixed rim, on which the inner periphery of the demountable rim is seated, the supports being circumferentially separated by clearances, and removable devices arranged circumferentially between, and adapted to support the demountable rim on the latter side in the clearances and alternately, with, the supports, said clearances extending to and said supports terminating at points remote from said devices to permit the demountable rim to be placed on and removed from the fixed rim, and the demountable rim to be tightened on the fixed rim without retardation between the supports.

11. In a vehicle-wheel, the combination of a wheel-body having a fixed rim with a flange on one side thereof, a demountable rim of conventional shape, three supports of limited length between the flange of the fixed rim and one side of the demountable rim separated by circumferential clearances, and removable devices arranged circumferentially and adapted to support the demountable rim in the clearances, between said supports, said clearances extending to and said supports terminating at points remote from said devices to permit the demountable rim to be placed on and removed from the fixed rim, and the demountable rim to be tightened on the fixed rim without retardation between the supports.

12. In a vehicle-wheel, the combination of a wheel-body having a fixed rim with an annular integral flange on one side thereof having a flared portion and a flange on the other side, a demountable rim of conventional shape, three integral supports of limited length on said other flange of the fixed rim, on which the demountable rim is supported, separated by circumferential clearances, and removable devices arranged circumferentially, and adapted to support the latter rim in the clearances, between said supports, said clearances extending to and said supports terminating at points remote from said devices to permit the demountable rim to be placed on and removed from the fixed rim, and the demountable rim to be tightened on the fixed rim without retardation between the supports.

Signed at Jackson, Michigan, this 20th day of March, 1924.

CHARLES F. RUBSAM.